Patented Jan. 19, 1943

2,309,070

UNITED STATES PATENT OFFICE 2,309,070

PROCESS FOR THE PREPARATION OF SELENIUM RUBY GLASS

Chester R. Austin and John D. Sullivan, Columbus, Ohio, assignors to Battelle Memorial Institute, Columbus, Ohio, a corporation of Ohio No Drawing. Application September 17, 1940, Serial No. 357,156

8 Claims. (Cl. 49—79)

Our invention relates to a process for the preparation of selenium ruby glass. It has to do, particularly, with a method of making such glass from a cheap base glass, although it is not necessarily limited thereto.

In the prior art practice, selenium and cadmium sulphide are normally used in the making of ruby glass. The base glasses usually contain appreciable amounts of zinc oxide. The base glass may be melted by batch or continuous methods, but the ruby glasses are ordinarily melted in pots by the batch process.

In batch melting, the glass forming ingredients are normally placed in a refractory pot, melted and "fined." The "fining" operation allows included gases to escape from the melt and homogenizes the glass. Following "fining," the glass is ready for forming operations.

In continuous melting practice, the glass-forming ingredients are more or less continuously fed into the melting end of a glass tank. On melting, the glass flows through a throat in a partition in the tank into the "fining" end of the tank where the glass is freed of gas bubbles and is homogenized. The "fined" glass flows into a forehearth adjacent the melting tank, from which it may be withdrawn as desired for forming operations.

Selenium-containing glasses, as formed at present, are not ruby-colored but are colorless or amber-colored. The formed ware is then reheated to bring out the desired ruby color. Because the time and temperature of reheating as well as the thickness of the glass sections affect the intensity of the ruby color, the percentage of "rejects" is large. There is a need in the art for a better method of making ruby glass.

In the prior art, also, the suggestion has been made that the selenium ruby color might be developed in certain glass batches as they are melted in the pot by adding certain ingredients to the batch, for example, elemental cadmium, cadmium selenide or cadmium sulpho-selenide. While it has been claimed that these additions to certain glass batches would insure the production of a ruby glass as drawn from the pot, this method has not been used successfully in a commercial way.

One of the objects of this invention is to produce a ruby glass which will be uniform in color.

Another object of this invention is to provide a method whereby products of ruby glass can be formed with assurance of uniform coloration thereof.

Another object of this invention is to produce a method of forming ruby glass which will be more simple than methods known in the prior art.

Still another object of this invention is to produce glassware which will be of a uniform and reproducible ruby color.

A further object of this invention is to bring about economy in heating and handling in the making of ruby glass and to make possible the utilization of mass production methods in a more effective way.

Still another object of this invention is to provide a selenium ruby glass wherein the ruby color of the glass may be controlled as to uniformity and as to degree and whereby glass products or articles may be formed therefrom of uniform ruby coloring and of any desirable depth of coloring.

As a result of considerable investigation, we have found that it is possible to produce a ruby color in a cheap base glass prior to the forming operation. Thus, we have been able to obtain uniform results in producing ruby-colored ware. Important features of our invention include a novel heat treatment, which may be termed "arrested cooling" and which is preferably given the glass as it cools from the "liquid" state. The glass is melted and "fined" by either batch or continuous methods, as previously indicated. The "liquid" glass is withdrawn from the pot or tank and held for a definite period at a predetermined temperature to permit the color to develop before pressing or otherwise forming. The specific operating conditions will be subsequently described. Thus, after forming, it is only necessary to perform the usual annealing operation. Since the ware is formed from the glass which already has a ruby color and wherein the color is uniform throughout, the number of "rejects" because of faulty coloration is very low. The process is equally applicable to batch and to continuous melting processes.

Preferably, ordinary soda-lime-silica types of glass are used, though various minor additions such as carbon, boric acid and sodium sulfate may be made. Other minor additions may be made, as is known to those skilled in the art, without departing from the scope of this invention. The usual range of base glass composition which may be used in this invention is about as follows:

| Ingredient: | Weight, per cent |
|---|---|
| $SiO_2$ | 69–74 |
| $Al_2O_3$ | 1– 4 |
| $Na_2O$, $K_2O$ | 13–16 |
| $CaO$, $MgO$ | 7–13 |

The alumina content appears important to the practice of this invention and such content should not be below about 1% for best results. As the alumina content is decreased the time required for the arrested cooling step becomes increasingly long. Increasing alumina decreases this time but at the expense of producing a more pasty and difficultly workable glass. For practical purposes 4% of alumina constitutes about the maximum amount which may be used, although we do not desire to be limited to such percentage. The alkali oxides and alkaline earth oxides may be varied about as shown above, the chief precaution being that they do not fall far outside the ranges which have been found to be best in ordinary glass manufacture. Minor substitutions and changes in the above listed composition may be made as long as the character of the glass is not radically changed. Zinc oxide in amounts of 1% or over has been found somewhat detrimental to the development of ruby color by the method of this invention, although we do not desire to be limited to such a percentage.

To a base glass of the type described above, cadmium sulfide and selenium are added to produce the desired ruby color. The actual amounts of each which are added are dependent on the particular ruby shade which is desired and the specific operating conditions. These ingredients may be added to the raw batch in about equal amounts up to 1% of each while the preferred addition consists of about 0.6% of selenium and 0.6% of cadmium sulfide. 1% cadmium sulfide includes .78% cadmium and .22% sulfur. The actual selenium in the final glass may be much lower because of volatilization and other losses. It has been found that only 0.03 to 0.06% selenium in the final glass is sufficient to produce selenium ruby glass. A high soda content in the base glass increases the amount of selenium required to produce a given color.

The glass-forming ingredients, that is, base glass plus selenium and cadmium sulfide are melted by either batch or continuous methods. However, it is desirable that the atmosphere surrounding the glass batch should be a reducing atmosphere, or at least an atmosphere which is not strongly oxidizing, during the melting operation. Our tests to date indicate that, if the atmosphere is too strongly oxidizing during the melting operation, the ruby color cannot be satisfactorily developed in the subsequent steps of this process, unless an unduly large amount of colorants is used. A combustion atmosphere produced from natural gas and air under conditions that it contains 2 to 5 per cent of CO and no free $O_2$ has been found to be satisfactory. The fusing temperature which is preferably used for a glass batch of the desired type is about 2600° to 2700° F.

After melting and "fining" the glass is preferably allowed to cool to about 1800° to 2300° F. and is preferably held at this temperature until used in the succeeding steps of delivery, formation, et cetera. In the batch operation, this holding may be effected in the pot, while in the continuous operation, it may be accomplished in the "fining" end of the melting tank or in a feeder or forehearth from which the glass is ultimately delivered to the forming apparatus.

In general, if the glass is held at temperatures above 2300° F., it fails to develop the desired ruby color following the subsequent steps. Instead, it remains an amber color. On the other hand, if this holding temperature is much below 1800° F., the glass becomes opaque rather than the desired clear ruby. So far as the selenium content is concerned, our tests show that the higher the selenium content, the higher this holding temperature may be.

After the glass reaches a temperature ranging from 1800° to 2300° F., it is subjected to that portion of this process which has been called the "arrested cooling" phase. In this phase, the glass is placed, for a length of time dependent upon the temperature used, in a heated zone which is maintained at a temperature of 1400° to 2100° F. It should be noted that the glass does not necessarily reach the temperature of this holding zone but is merely held in this zone for a sufficient time to permit the development of the desired ruby color. The temperature of this holding zone is preferably never higher than the original holding temperature. The time period of this arrested cooling of the glass in this zone is directly related to the temperature used, that is, the higher the temperature, the longer the time required for the color development. At 1400° F., only 5 or 10 seconds are required, while at 2100° F., a minute is required, these figures being merely illustrative. Our tests indicate that above 2100° F., in the arrested cooling zone, it is not possible to cause the color to develop while below 1400° F., the time becomes so short as to be quite difficult to control, if a ruby color is produced at all. In addition, there is a tendency for the glass to cool below the forming temperature. An important feature of our process is the fact that the glass is held at such a temperature in the arrested cooling zone that forming can take place immediately on withdrawal of the glass from the zone.

After this arrested-cooling treatment has been applied the desired ruby color has been developed uniformly throughout the glass. The ware produced from this glass by forming operations at the conclusion of this process will be uniform in color and does not require a color-striking operation. Of course, the usual stress-relieving anneal must be given the ware. Because the color is developed in the glass mass prior to forming, rather than in the formed ware, sections of varying thickness may be produced with a uniform color, and a given piece of ware is easily reproducible.

The exact mechanism of the coloring of glass by selenium and cadmium sulfide by the prior art method and by the method of our invention is not fully understood. However, the following is suggested as a possible explanation, without restricting our invention to these hypotheses. In the prior art method of producing ruby glass by "color-striking" operations, the color is in solution in the glass as fused and as formed. The color-striking operation produces a precipitation of fine particles of the solid colorant which causes the ruby color. In the present invention, the color is present in solution in the glass melt, as in the prior art, but during the arrested cooling of this invention, the colored particles are caused to precipitate in the glass prior to the forming of glass articles therefrom and the ruby color is thereby imparted and insured in the glass mass.

By carrying on this color development at a suitably elevated temperature, forming of the colored glass can be accomplished while the glass is still pyroplastic. When conditions are such that an insufficient number of particles are precipitated, or the size of the particles is not right, the resultant glass is merely amber in color. On the other hand, if too many particles are precipitated or if these particles are too large, the glass is cloudy or opaque. While these hypotheses may not be entirely correct, they offer a possible explanation of the phenomena which have been observed.

It will be seen that we have provided a novel method which permits the production of ruby glass that will be uniform in color and that can be formed into products or articles which will also have uniform coloration. It will likewise be apparent that we have provided a method of making ruby glass which will obviate the necessity of using a special step of reheating the glass articles or products after they are formed. It will likewise be evident that we have devised a method which will not only be simple but which will bring about economy in the handling and making of ruby glass and which will facilitate the utilization of mass production methods for making such glass. It will likewise be seen that our method permits of the control of the ruby color of the glass as to uniformity and degree or depth of coloring.

Having thus described our invention, what we claim is:

1. The process of preparing a selenium ruby glass which consists of melting a glass batch having a soda-lime-silica base and containing selenium, cadmium sulfide and alumina, withdrawing the glass from the melt at a temperature ranging from 1800° to 2300° F. and holding it in a zone at a temperature ranging from 1400° to 2100° F. for a time sufficient to develop the desired color.

2. The process of preparing a selenium ruby glass which consists of melting a glass batch having a soda-lime-silica base and containing selenium, cadmium sulfide and alumina, at a temperature ranging from 2600° to 2700° F., withdrawing the glass from the melt at a temperature ranging from 1800° to 2300° F., and holding this glass in a zone at a temperature ranging from 1400° F. to 2100° F. for a time sufficient to develop the desired color.

3. The process of preparing a selenium ruby glass which consists of melting a glass batch having a soda-lime-silica base and containing selenium, cadmium sulfide and alumina, at a temperature ranging from 2600° to 2700° F., withdrawing the glass from the melt at a temperature ranging from 1800° to 2300° F., holding the glass in a zone at a temperature ranging from 1400° to 2100° F. for a period sufficient to develop the desired color, forming the glass into the desired article, and subjecting the formed article to a strain-relieving anneal.

4. The process of preparing a selenium ruby glass which comprises withdrawing the molten glass from a melt having a soda-lime-silica base and containing selenium, cadmium sulfide and alumina, at a temperature ranging from 1800° to 2300° F. and holding this glass for a period ranging from 5 to 60 seconds in a zone wherein the temperature is between 1400° and 2100° F.

5. The process of preparing a selenium ruby glass which comprises the preparation of a glass melt containing 69 to 74% $SiO_2$, 13 to 16% $Na_2O$—$K_2O$, 7 to 13% CaO—MgO, at least 0.03% selenium, cadmium sulfide in amounts effective, in conjunction with the selenium, to produce a ruby color but not in excess of 1% and 1 to 4% $Al_2O_3$, withdrawing the molten glass from the melt at a temperature ranging from 1800° to 2300° F., and holding this glass in a zone at a temperature ranging from 1400° F. to 2100° F. for a time sufficient to develop the desired color.

6. A process according to claim 2 wherein the glass batch is melted in a reducing atmosphere.

7. The process of preparing a selenium ruby glass which consists of melting a glass batch to produce a melt having a soda-lime-silica base and containing from 0.03 to 1% selenium, cadmium sulfide in amounts effective, in conjunction with the selenium, to produce a ruby color but not in excess of 1% and from 1 to 4% alumina, withdrawing the glass from the melt at a temperature ranging from 1800° to 2300° F. and holding it in a zone at a temperature ranging from 1400° to 2100° F. for a time sufficient to develop the desired color.

8. The process of preparing a selenium ruby glass which comprises withdrawing the molten glass from a melt having a soda-lime-silica base and containing from 0.03 to 1% selenium, cadmium sulfide in amounts effective, in conjunction with the selenium, to produce a ruby color but not in excess of 1%, and from 1 to 4% alumina at a temperature ranging from 1800° to 2300° F. and holding this glass for a period ranging from 5 to 60 seconds in a zone wherein the temperature is between 1400° and 2100° F.

CHESTER R. AUSTIN.
JOHN D. SULLIVAN.